United States Patent
Sugawara

[11] Patent Number: 5,246,186
[45] Date of Patent: Sep. 21, 1993

[54] SPINNING REEL WITH A DISPLACEABLE ELEMENT CONTACTING THE BAIL ARM LEVER

[75] Inventor: Kenichi Sugawara, Sakai, Japan
[73] Assignee: Shimano, Inc., Osaka, Japan
[21] Appl. No.: 743,185
[22] Filed: Aug. 9, 1991

[30] Foreign Application Priority Data
Aug. 24, 1990 [JP] Japan .................. 2-88599[U]

[51] Int. Cl.⁵ .......................................... A01K 89/027
[52] U.S. Cl. .................................. 242/232; 242/248; 242/300
[58] Field of Search ............. 242/243, 247, 248, 298, 242/299, 300, 311, 316, 232

[56] References Cited
U.S. PATENT DOCUMENTS

| | | | |
|---|---|---|---|
| 2,515,896 | 7/1950 | Rakaczy | 242/243 X |
| 2,648,505 | 8/1953 | Mauborgne | 242/243 |
| 3,045,942 | 7/1962 | Henze | 242/243 X |
| 4,195,793 | 4/1980 | Stiner | 242/311 |
| 4,529,142 | 7/1985 | Yoshikawa | 242/243 |
| 4,640,134 | 3/1987 | Councilman | 242/248 |
| 4,824,045 | 4/1989 | Kawabe | 242/247 |

FOREIGN PATENT DOCUMENTS

| | | | |
|---|---|---|---|
| 0054425 | 12/1981 | European Pat. Off. | |
| 1073794 | 1/1960 | Fed. Rep. of Germany | 242/247 |
| 3047379 | 12/1981 | Fed. Rep. of Germany | 242/243 |
| 2204221A | 5/1988 | United Kingdom . | |
| 2205721A | 5/1988 | United Kingdom . | |

Primary Examiner—Joseph J. Hail, III
Attorney, Agent, or Firm—Dickstein, Shapiro & Morin

[57] ABSTRACT

In a spinning reel where a reverse rotation of a rotor is prevented through cooperation between a contact portion and an anti-reverse mechanism, the invention's spinning reel includes a displacement-allowing mechanism for allowing the contact portion to be displaced to a position permitting a pivotal motion of an arm lever when a bail is set at its open position.

5 Claims, 4 Drawing Sheets

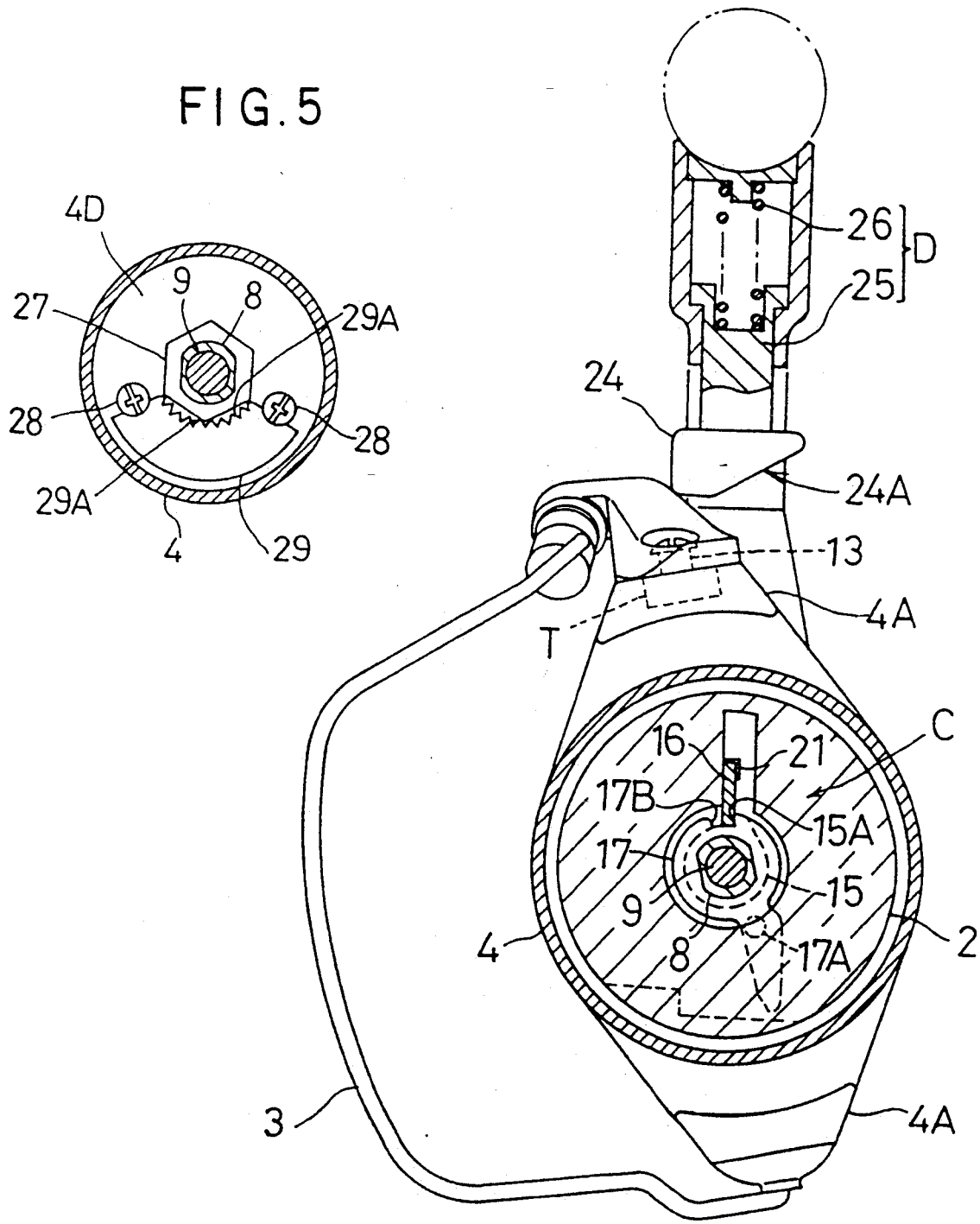

SPINNING REEL WITH A DISPLACEABLE ELEMENT CONTACTING THE BAIL ARM LEVER

BACKGROUND OF THE INVENTION

1. Field of the Invention

The present invention relates to a spinning reel, and more particularly a spinning reel including a bail extending between a pair of arm portions of a rotor rotated by a handle, a toggle mechanism for maintaining the bail at either a takeup position and an open position, an anti-reverse mechanism having a ratchet wheel attached to a component rotatable with the rotor and a ratchet claw engageable with the ratchet wheel, and a contact portion attached to a reel body and contactable with a side face of an arm lever supporting a line guide roller of the rotor only when the bail is set to the open position, the anti-reverse mechanism having its rotation-preventing phase so set as to allow engagement between the ratchet wheel and the ratchet claw when the contact portion is placed in contact with or adjacent the arm lever.

2. Description of the Related Art

Generally, the spinning reel having the above-described construction is used for a baitcasting. In operation, for casting a fishing gear, rotation of the rotor in a line retrieving direction is restricted through the contact between the arm lever and the contact portion. Further, reverse rotation of the rotor in a line feeding direction is prevented by the anti-reverse mechanism, thus preventing inadvertent rotation of the rotor during the line casting operation.

That is, when a fishing rod attached with the spinning reel is swung, a strong force may act on the handle for urging it to rotate in the line retrieving direction, depending on the current posture of the handle. And, the rotor too is subjected to a strong rotating force in the line retrieving direction. Then, if a large gap is present between the arm lever and the contact portion, the inertial force of the rotor may accidentally switch over the bail to its takeup position.

The anti-reverse mechanism of the above type is known from e.g. a Japanese published utility model No. 63-64.

Referring to operational steps for establishing the contact between the arm lever and the contact portion and for preventing the reverse rotor rotation by means of the anti-reverse mechanism according to the above-described spinning reel, this conventional anti-reverse mechanism uses a friction type rotation restricting means. In operation, when the rotor is rotated in the line takeup direction to bring the ratchet wheel and the ratchet claw into an engageable phase relative to each other, the restricting means maintains its condition for preventing the engagement between the wheel and the claw. Therefore, according to this convention, after the rotor is rotated slightly beyond the rotation-prevented phase in the line takeup direction, the rotor is then reversely rotated to actuate the anti-reverse mechanism, thus switching over the arm lever to its open position to bring it into contact with the contact portion.

However, in the course of the above casting operation, the reverse rotating operation of the rotor must be substantially simultaneously accompanied by the switching operation of the bail arm to its open position against an urging force of the toggle mechanism. So that the angler tends to apply too strong a force to the rotor which actually needs to be operated delicately. As a result, the rotor may be improperly displaced from where it should be. Therefore, the convention has room for improvement in terms of handling ease.

The primary object of the present invention is to provide an improved spinning reel which can solve the above problems of the prior art. With the invention's reel, the operation for setting the rotor to the non-rotatable condition is significantly facilitated.

SUMMARY OF THE INVENTION

For realizing the above-noted object, according to the present invention, in a spinning reel of the aforedescribed type where a reverse rotation of the rotor is prevented through cooperation between a contact portion and an anti-reverse mechanism, the spinning reel comprises a displacement-allowing mechanism for allowing the contact portion to be displaced to a position permitting a pivotal motion of an arm lever when the bail is set at its open position.

Functions and effects of this construction will be described next.

This construction can be embodied as shown in FIGS. 2 through 4, for example. In this, the rotor 4 is rotated in the line takeup direction to its rotational phase slightly beyond a phase where teeth 15A of the rachet wheel 15 come into contact with the ratchet claw 16. In this condition, the arm lever 14 is switched over to its open position B. After the rotor 4 is reversely rotated while displacing the contact portion 24 to the non-contact direction by the displacement-allowing mechanism, the contact portion 24 is then set to the contact position. This realizes both the anti-reverse condition of the anti-reverse mechanism C and the restriction through the contact between the contact portion 24 and the arm lever 14.

Consequently, the invention's construction can eliminate the difficulty of reversely rotating the rotor while switching over the bail having the large operational load to the open position.

Therefore, through the relatively simple arrangement of the displaceable contact portion, the invention has achieved the intended object of providing such an improved spinning reel which facilitates the setting operation of the rotor to the non-rotatable condition without increasing operation noise during the rotation of the rotor in the line takeup direction.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate a preferred embodiment of a spinning reel relating to the present invention, in which;

FIG. 4 is a front view showing the rotor being maintained at the contact position, and FIG. 5 is a front view of a balancer.

DESCRIPTION OF THE PREFERRED EMBODIMENTS

Figure 1:
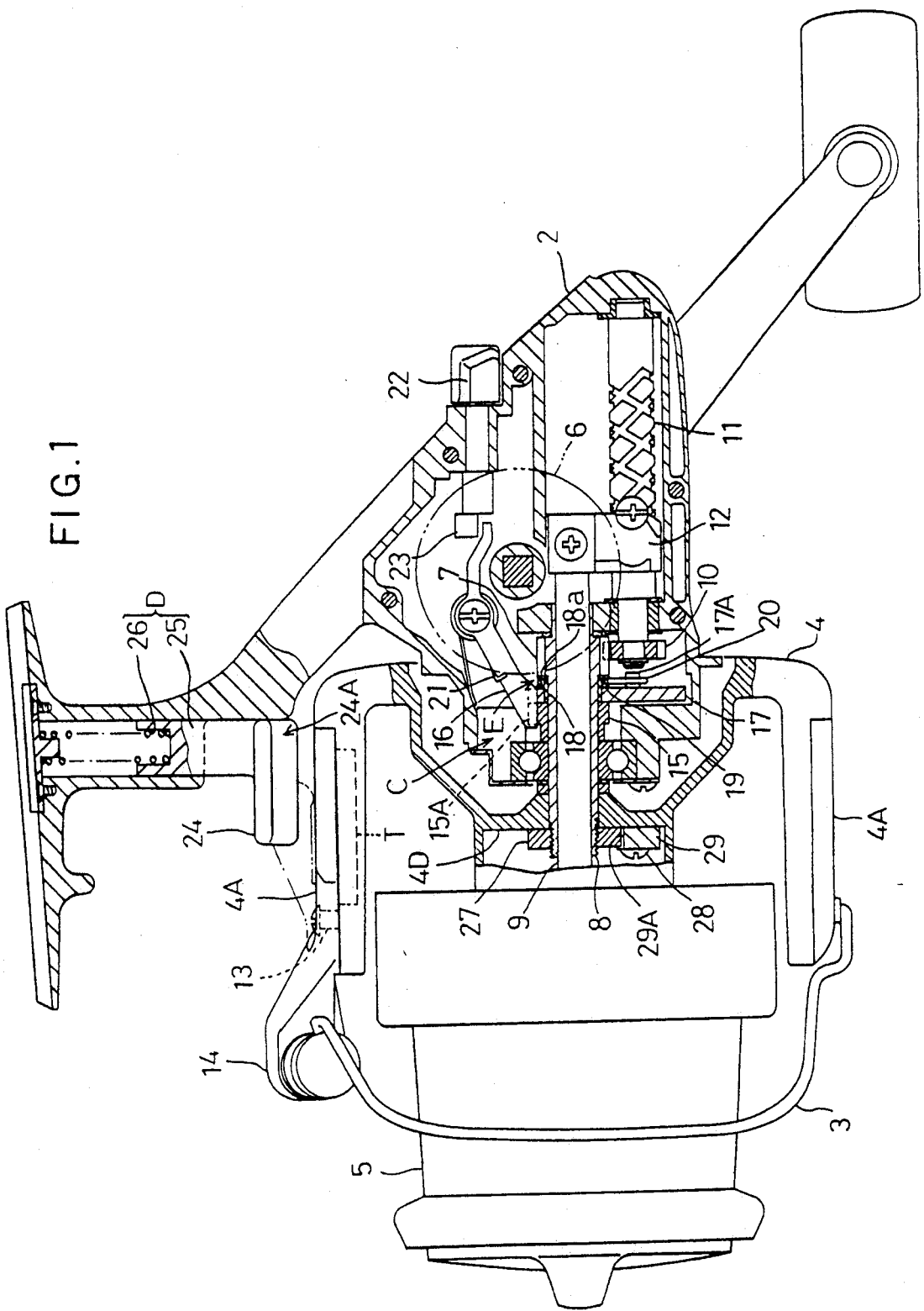
FIG. 1 is a side view in vertical section showing a spinning reel of the embodiment.

Preferred embodiments of a spinning reel relating to the present invention will now be described in detail with reference to the accompanying drawings.

As shown in FIGS. 1 through 4, a spinning reel includes a reel body 2 having a handle and a rotor 4 having a bail 3 and a spool 5 both disposed at forward positions of the reel body 2. The reel further includes a drive mechanism for transmitting force from a drive gear 6 associated with the handle to the rotor 4 through a pinion gear 7 and a cylinder shaft 8 and an osillating mechanism having an input gear 10, a worm shaft 11 and a transmission member 12 and for converting the rotational force from the pinion gear 7 into a reciprocating force and then transmitting this reciprocating force to a spool shaft 9.

The rotor 4 includes a pair of arm portions 4A, 4A. And, the bail 3 extends between an arm lever 14 supported to a support shaft 13 to be pivotable relative to the one arm portion 4A and the other arm portion 4A. The arm lever 14 receives an urging force from a toggle mechanism T (its construction will not be detailed here) disposed inside the arm portion 4A so as to selectively maintain the bail 3 together with the arm lever 14 either at a line takeup position A and an open position B.

The spinning reel further includes an anti-reverse mechanism C consisting essentially of a ratchet wheel 15 fixed on the cylinder shaft 8, a ratchet claw 16 engageable with teeth 15A of the ratchet wheel 15 and of a restricting member 17 fitted on the cylinder shaft 8 through a friction portion E and operable to allow engagement between the ratchet claw 16 and the ratchet wheel 15 only when the rotor 4 is rotated in a line feeding direction.

In comparison with the conventional anti-reverse mechanism consisting of a ratchet wheel and a ratchet claw spring-urged towards the ratchet wheel, the above-described construction is advantageous for minimizing generation of contact noise between the wheel and the claw when the rotor is rotated in a line takeup direction.

Figure 2:
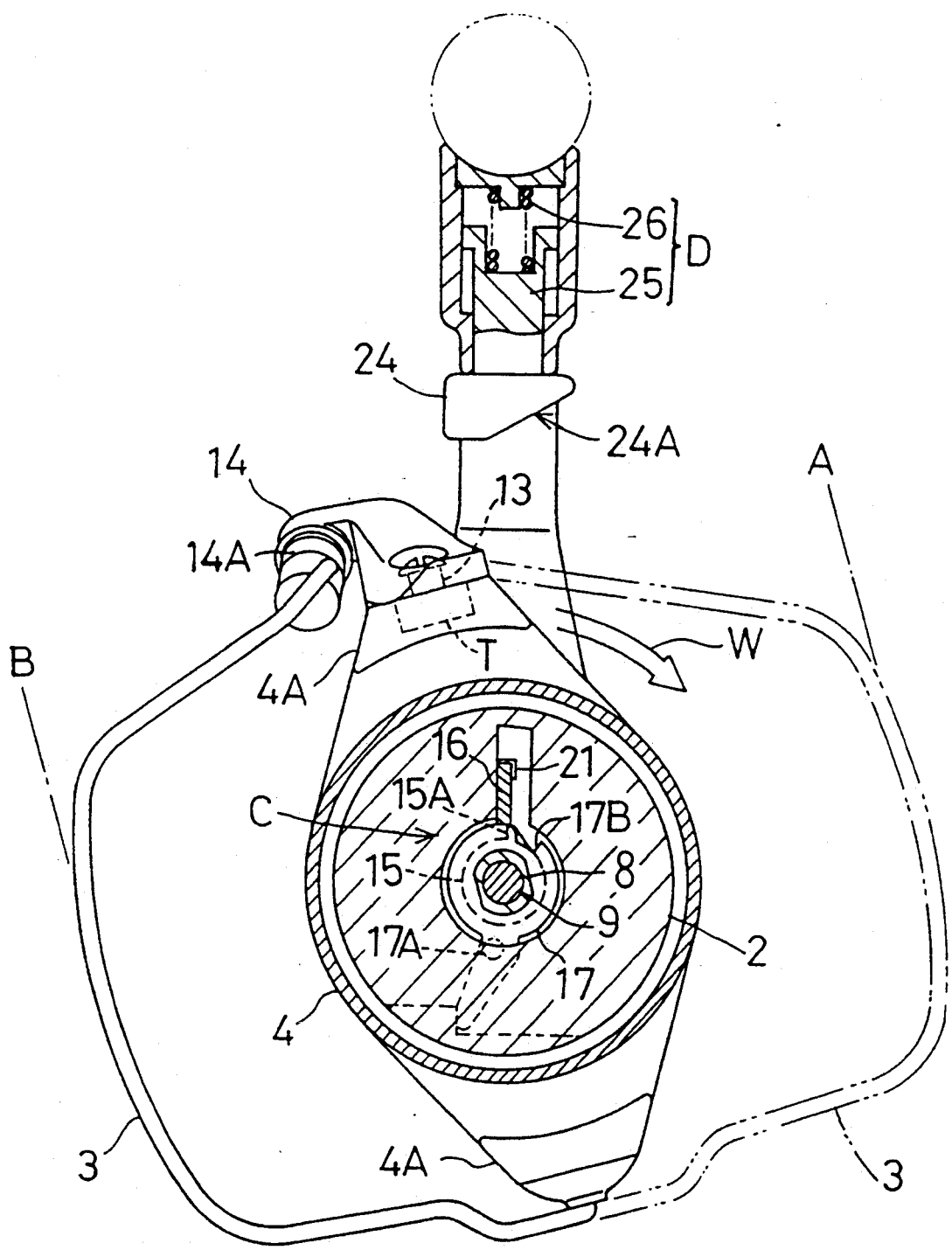
FIG. 2 is a front view showing a condition where a contact portion is flipped up.
Figure 3:
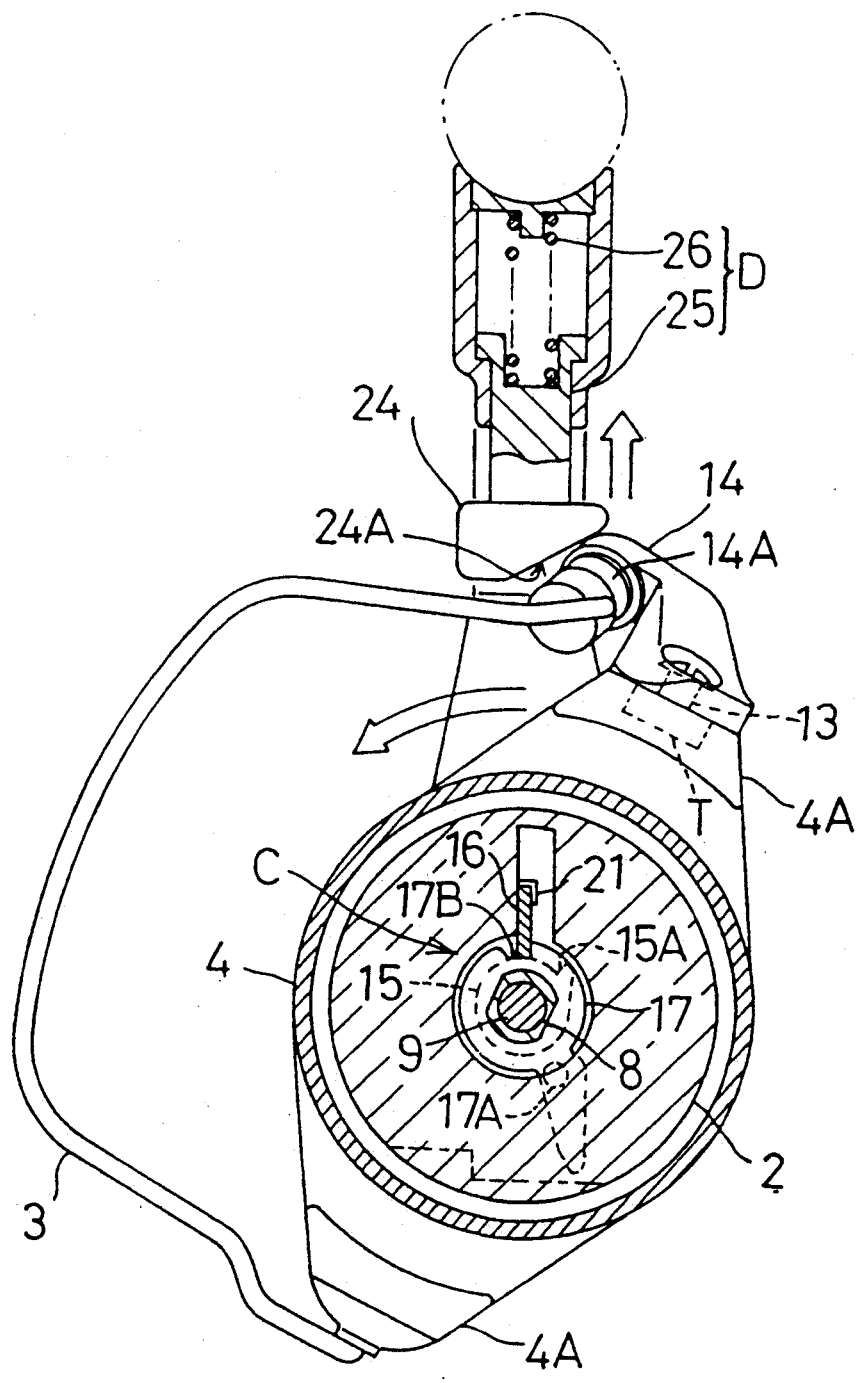
FIG. 3 is a front view showing a condition for operating a rotor to a contact position.

Incidentally, at the friction portion E a spring element 20 is fitted between a brim portion 18a of a sleeve fitted about the cylinder shaft 8 and a washer 19; and a terminal end of the spring element 20 is stopped to a pin 17A of the restricting member 17. When the rotor 4 is rotated in the line takeup direction W, as shown in FIG. 2, the restricting member 17 is position-set to prevent the engagement between the ratchet wheel 15 and the ratchet claw 16. Conversely, when the rotor 4 is rotated in the line feeding direction, as shown in FIG. 3, the restricting member 17 is moved to allow, through its cutout portion 17B, the engagement between the teeth 15A of the ratchet wheel 15 and the ratchet claw 16.

The ratchet claw 16 is urged for the engagement by means of a spring 21 and this claw 16 is also settable to an unengageable position through its contact with a control element 23 of a switch-over lever 22.

At a leg portion extending from a reel foot through which the reel body 2 is attached to a fishing rod, there is attached, through a displacement-allowing mechanism D, a contact portion 24 for preventing rotation of the rotor 4 through its contact with a side face (a lower side face relative to the line takeup direction) of the arm lever 14 for supporting a line guide roller 14A when the bail 3 is set to the open position B.

More particularly, the contact portion 24 includes a sloped lower face 24A; whereas, the displacement-allowing mechanism D includes a guide rod 25 connected to the contact portion 24 and a spring 26 for urging the contact portion 24 to project it downwards.

In this spinning reel, the anti-reverse mechanism C is provided with a rotation-preventing phase arrangement so that the engagement between the ratchet claw 16 and the ratchet wheel 15 is allowed when the arm lever 14 is placed in contact with the lower face 24A of the contact portion 24. For restricting rotation of the rotor 4, as shown in FIG. 2 for instance, the bail 3 is set to the open position B and then the contact portion 24 is flipped up by the angler's finger and the rotor 4 is rotated in the line takeup direction until the arm lever 14 reaches an appropriate position beyond the under position of the contact portion 24. Thereafter, the contact portion 24 is flipped down and the rotor 4 is rotated reversely. Alternately, the bail 3 is set to the line takeup position, and the rotor 4 is rotated in the line takeup direction until the arm lever 14 reaches the appropriate position beyond the under position of the contact portion 24. Thereafter, the bail 3 is set to the open position B and the rotor 4 is reversely rotated. With these steps alone, as shown in FIG. 3, the contact portion 24 is upwardly displaced to allow rotation of the rotor 4 and also associated movement of the restricting member 17 brings the ratchet claw 16 into engagement with the teeth 15A of the ratchet wheel 15. Thereafter, as the contact portion 24 is returned by the urging force of the spring 26, as illustrated in FIG. 4, the contact between the arm lever 24 and the contact portion 14 and the engagement between the ratchet wheel 15 and the ratchet claw 16 together prevent rotation of the rotor 4.

Incidentally, the connection between the cylinder shaft 8 and the rotor 4 is done through insertion of the cylinder shaft 8 into a disc portion 4D of the rotor 4 and tightening of a nut 27 screw-engageable with the cylinder shaft 8. Also, as illustrated in FIG. 5, loosening of the nut 27 is prevented through engagement between this nut 27 and a cutout portion 29A of a balancer 29.

In addition to the constructions described in connection with the foregoing embodiment, the invention may be embodied in any other manner. For instance, the displacement-allowing mechanism can be so modified as to pivot the contact portion. Further, this mechanism can be so constructed that the displacement of the contact portion is done manually.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body, a spool, and a rotatable handle;
   a rotor disposed frontwardly of said reel body, said rotor being rotatable in association with rotation of said handle;
   a bail arm lever supported on said rotor, said bail arm lever being pivotable relative to said rotor between an open position to allow releasing of a fishing line from said spool and a line take-up position to take up fishing line on said spool, said bail arm lever including a bail wire;

a contacted portion defined on said bail arm lever said contacted portion being displaced toward said reel body when said bail arm lever is pivoted from said take-up position to said open position;

a displaceable contacting portion defined on said reel body, said displaceable contacting portion being displaceable between first and second positions, wherein said contacting portion is within a rotating locus of said contacted portion when said bail arm lever and said contacting portion are in said open and first positions, respectively, and wherein said contacting portion is not within a rotating locus of said contacted portion when said bail arm lever and said contacting portion are in said open and second positions, respectively; and an anti-reverse mechanism for allowing said rotor to rotate only in a line take-up direction, said anti-reverse mechanism acting at least at a rotational region of said rotor when said contacted portion of said bail arm lever contacts said contacting portion.

2. A spinning reel as defined in claim 1, wherein said displaceable contacting portion includes a lower sloped surface for contacting said contacted portion of said bail arm lever.

3. A spinning reel as defined in claim 1, further comprising a slidable guide rod, said contacting portion being mounted on said guide rod, said guide rod including means for urging said contacting portion from said second position to said first position.

4. A spinning reel as defined in claim 3, wherein said reel body includes a main body portion, a reel foot, and a leg portion for connecting said reel foot to said main body portion, said guide rod being provided on said leg portion, and being displaceable along said leg portion.

5. A spinning reel as defined in claim 1, wherein said anti-reverse mechanism is a silent cam mechanism comprising a ratchet wheel and a ratchet claw pivotably supported on said reel body, said ratchet wheel being integrally rotatable with said rotor, said ratchet claw being engageable with and disengageable from said ratchet wheel.

* * * * *